United States Patent [19]

Shirai et al.

[11] Patent Number: 5,588,433
[45] Date of Patent: Dec. 31, 1996

[54] ULTRASONIC DIAGNOSTIC APPARATUS

[75] Inventors: Takeshi Shirai; Wataru Yagi, both of Kawasaki, Japan

[73] Assignee: Fujitsu Limited, Kawasaki, Japan

[21] Appl. No.: 571,103

[22] Filed: Dec. 12, 1995

[30] Foreign Application Priority Data

Apr. 18, 1995 [JP] Japan ................................ 7-092656

[51] Int. Cl.⁶ .................................................. A61B 8/00
[52] U.S. Cl. ........................................................ 128/660.05
[58] Field of Search ........................ 128/660.04, 660.05, 128/660.07, 660.08, 661.01, 661.07, 661.08, 661.09; 73/619, 621, 602, 596, 599

[56] References Cited

U.S. PATENT DOCUMENTS 4,389,893  6/1983  Ophir et al. ................. 73/599
5,299,577  4/1994  Brown et al. ................. 128/607

*Primary Examiner*—George Manuel
*Attorney, Agent, or Firm*— Staas & Halsey

[57] ABSTRACT

There is provided an ultrasonic diagnostic apparatus in which ultrasonic waves are transmitted and received in directions each along the associated one of a plurality of scan lines extending in a depth direction within the subject to obtain received signals, and data representative of displacement of the respective pixel points along each scan line within the subject are evaluated on the basis of the thus obtained received signals, thereby displaying an image based on the data representative of the displacement. According to the ultrasonic diagnostic apparatus, color data of a pixel train involved in the presence of displacement (color-displayed) appearing continuously by less than N pixels (typically, one pixel to two or three pixels at most) is replaced by data representative of the absence of the displacement (not color-displayed).

16 Claims, 6 Drawing Sheets

COLOR NOISES

1

ULTRASONIC DIAGNOSTIC APPARATUS

BACKGROUND OF THE INVENTION

1. Field of the Invention

The present invention relates to an ultrasonic diagnostic apparatus in which ultrasonic waves are transmitted and received in directions each along the associated one of a plurality of scan lines extending in a depth direction within the subject to obtain received signals, and data representative of displacement of the respective pixel points along each scan line within the subject are evaluated on the basis of the thus obtained received signals, thereby displaying an image based on the data representative of the displacement.

2. Description of the Related Art

Hitherto, there has been used an ultrasonic diagnostic apparatus in which ultrasonic waves are transmitted toward the subject, specially a living body, ultrasonic waves reflecting from a tissue within the living body are received to generate received signals, and a tomographic image of the living body is displayed on the basis of the received signals, thereby facilitating a diagnostic of diseases of the viscus inner organ or the like in the living body. According to such an ultrasonic diagnostic apparatus, usually, there is also provided such a function that a blood flow velocity within the subject is evaluated on the basis of Doppler displacement information carried by the received signal obtained through a plurality of number of times of receiving in the same direction within the subject, the blood flow of which a direction approaches a probe is indicated by, for example, red and the blood flow of which a direction is going away from the probe is indicated by, for example, blue, and a color image representative of the blood flow velocity with a luminance of those colors is created.

The above-mentioned tomographic image is referred to as a B-mode image and is usually displayed with a black-and-white image. Thus, image data representative of the B-mode image is referred to as black-and-white data. On the other hand, an image representative of a blood flow distribution is usually superposed on, for example, the B-mode image and displayed with color. Thus, the image representative of the blood flow distribution is referred to as a color Doppler image or a color image. And image data representative of the color Doppler image is referred to as color data.

FIG. 5 is a block diagram showing a schematic construction of a portion of a color Doppler function of an ultrasonic diagnostic apparatus according to the related art.

High voltage pulses are applied from a transmitting and receiving unit 2 to an ultrasonic probe 1. Upon receipt of the high voltage pulses, the ultrasonic probe 1 transmits ultrasonic waves into the subject (not illustrated). The ultrasonic waves transmitted from the ultrasonic probe 1 are subjected to a Doppler displacement with the blood flow within the subject and reflected into the ultrasonic probe 1. The ultrasonic waves thus received by the ultrasonic probe 1 are converted into received signals. The received signals are fed to the transmitting and receiving unit 2 so as to be subjected to a predetermined beamforming process. An output of the transmitting and receiving unit 2 is fed to a quadrature detector 3 so as to be subjected to a quadrature detecting process. A Doppler displacement component obtained through the quadrature detecting process by the quadrature detector 3 is supplied to an A/D converter unit 4. Digital signals obtained through the A/D converter unit 4 are fed to an MTI filter 5 to remove a clutter component and then fed to a velocity arithmetic unit 6 to evaluate a velocity of a blood flow on each portion within the tomographic plane.

The blood flow velocity obtained through the velocity arithmetic unit 6 includes a remarkably large noise component. Consequently, the signals passing through the MTI filter 5 are also fed to a power arithmetic unit 7 to evaluate a blood flow power. The blood flow power thus obtained is supplied to a first noise suppression filter 8 in which the blood flow velocity evaluated in the velocity arithmetic unit 6 is replaced by the velocity value zero so that no color display is implemented with respect to a point or an area on which the blood flow power is given by a value less than a predetermined level. The blood flow velocity outputted from the first noise suppression filter 8 is fed to a scan converter 9 to be converted into data for a display, and further passed through a second noise suppression filter 11 to a CRT. Upon superposing the blood flow velocity thus processed on the B-mode image based on, for example, black-and-white data, a color Doppler image is displayed on screen of the CRT.

According to the second noise suppression filter 11, the blood flow velocity is replaced by the velocity value zero so that no color display is implemented with respect to pixels involved in black-and-white data associated with ones exceeding a predetermined luminance, in view of the fact that on the B-mode image the inside of the blood vessel is displayed with the lower luminance, and the walls of the blood vessel and the domains of a high density of tissue are displayed with the higher luminance.

Incidentally, while the black-and-white data are also generated on the basis of the received signals outputted from the transmitting and receiving unit 2, the way of generation of the black-and-white data is not directly concerned with the present invention ans is also well known. Hence, the explanation of such a technology will be omitted. Further, the fundamental arithmetic technology for obtaining the color data is also well known and thus additional explanation will be omitted.

FIG. 6 is a typical illustration of color noises on an image.

According to the ultrasonic diagnostic apparatus of the related art as mentioned above, since the blood flow velocity obtained through the velocity arithmetic unit 6 includes large noises, the noise eliminating processing is performed on the basis of the blood flow power by the first noise suppression filter 8, and further additional noise eliminating processing is performed on the basis of the value of the black-and-white data (luminance of the B-mode image) by the second noise suppression filter 11. However, the blood flow power and the noise power do not always match, and further it does not always say that portions other than the blood flow display portion involve high luminance. Thus, the ultrasonic diagnostic apparatus according to the related art has been associated with such a drawback that color noises remain thereby providing images which are hard to see on each frame.

Specifically, when the blood flow on a deep portion within the subject or a low velocity of blood flow is displayed on a display screen, if a gain of the color Doppler image decreased until the color noises disappear, the sensitivity also goes down and as a result it happens that not only the noises but also the essential blood flow are not clearly displayed.

SUMMARY OF THE INVENTION

In view of the foregoing, it is therefore an object of the present invention to provide an ultrasonic diagnostic apparatus having such a function that a color Doppler image from which color noises are efficiently eliminated is created and displayed.

To achieve the above-mentioned objects, according to the present invention, there is provided an ultrasonic diagnostic apparatus in which ultrasonic waves are transmitted and received in directions each along the associated one of a plurality of scan lines extending in a depth direction within the subject to obtain received signals, and data representative of displacement of respective pixel points along each scan line within the subject are evaluated on the basis of the thus obtained received signals, thereby displaying an image based on the data representative of the displacement, the ultrasonic diagnostic apparatus comprising N data train eliminating means for performing such a data replacement arithmetic operation that with respect to a pixel train wherein pixels of which data are representative of the presence of displacement appear continuously within N pixels in a predetermined direction, where N is a positive integer, data involved in the pixels constituting of said pixel train are replaced by data representative of the absence of the displacement.

In the ultrasonic diagnostic apparatus as mentioned above, said N data train eliminating means may perform further such a data replacement arithmetic operation that with respect to a pixel train wherein pixels of which data are representative of the presence of displacement appear continuously over N+1 pixels in said predetermined direction, data involved in N pixels appearing continuously from one end of said pixel train among the pixels constituting of said pixel train are replaced by data representative of the absence of the displacement.

In the ultrasonic diagnostic apparatus as mentioned above, said N data train eliminating means may perform the data replacement arithmetic operation, where a direction in which each scan line extends is referred to as said predetermined direction; said N data train eliminating means may perform the data replacement arithmetic operation, where a direction coupling pixel-to-pixel in the same depth on the respective scan lines is referred to as said predetermined direction; or said N data train eliminating means may comprise a first N data train eliminating means for performing the data replacement arithmetic operation, where a direction in which each scan line extends is referred to as said predetermined direction, and a second N data train eliminating means for performing the data replacement arithmetic operation, where a direction coupling pixel-to-pixel in the same depth on the respective scan lines is referred to as said predetermined direction.

In the observation of color images, it is noticed that as to the domain corresponding to the essential blood flow distribution a fairly large amount of pixels are color-displayed on a united basis, whereas the noise component is isolated and color-displayed by one pixel in a B-mode image, otherwise only few pixels such as two or three pixels at most continues.

The present invention has been completed on the basis of the point of view as mentioned above.

According to the ultrasonic diagnostic apparatus of the present invention, color data of a pixel train involved in the presence of displacement (color-displayed) appearing continuously by less than N pixels (typically, one pixel to two or three pixels at most) is replaced by data representative of the absence of the displacement (not color-displayed). This feature makes it possible to obtain a color Doppler image emphasizing only a color display of the essential blood flow component and reducing flickering of color noises, without decreasing a gain of the color image in its entirety, since the color display pixel train less than N pixels disappears.

In the ultrasonic diagnostic apparatus as mentioned above, said N data train eliminating means may perform further such a data replacement arithmetic operation that with respect to a pixel train wherein pixels of which data are representative of the presence of displacement appear continuously over N+1 pixels in said predetermined direction, data involved in N pixels appearing continuously from one end of said pixel train among the pixels constituting of said pixel train are replaced by data representative of the absence of the displacement. This feature makes it possible to constitute the N data train eliminating means with a relatively simple circuit structure. In this case, the color display portion by the essential blood flow distribution is also reduced by the corresponding N pixels. However, usually, the color display area by the essential blood flow distribution consists of multiple pixels and thus there is no problem even if the color display area is reduced somewhat. On the other hand, in this case, color noises of the pixel train exceeding N pixels which exists rarely are also reduced by the corresponding N pixels. Therefore, there is such an advantage that the color noises are inconspicuous.

In the ultrasonic diagnostic apparatus according to the present invention, it is acceptable that a direction (a predetermined direction referenced above) along which pixels each as an object of an arithmetic operation are aligned is given by a direction (a depth direction of the subject) toward which the scan line extends, or a direction coupling pixel-to-pixel in the same depth on a plurality of scan lines. In this case, if the data replacement arithmetic operation is carried out on one of those two directions and in addition on another as well, it is possible to more reliably eliminate the color noises.

DESCRIPTION OF THE PREFERRED EMBODIMENTS

Hereinafter, there will be described embodiments of the present invention.

Figure 1:
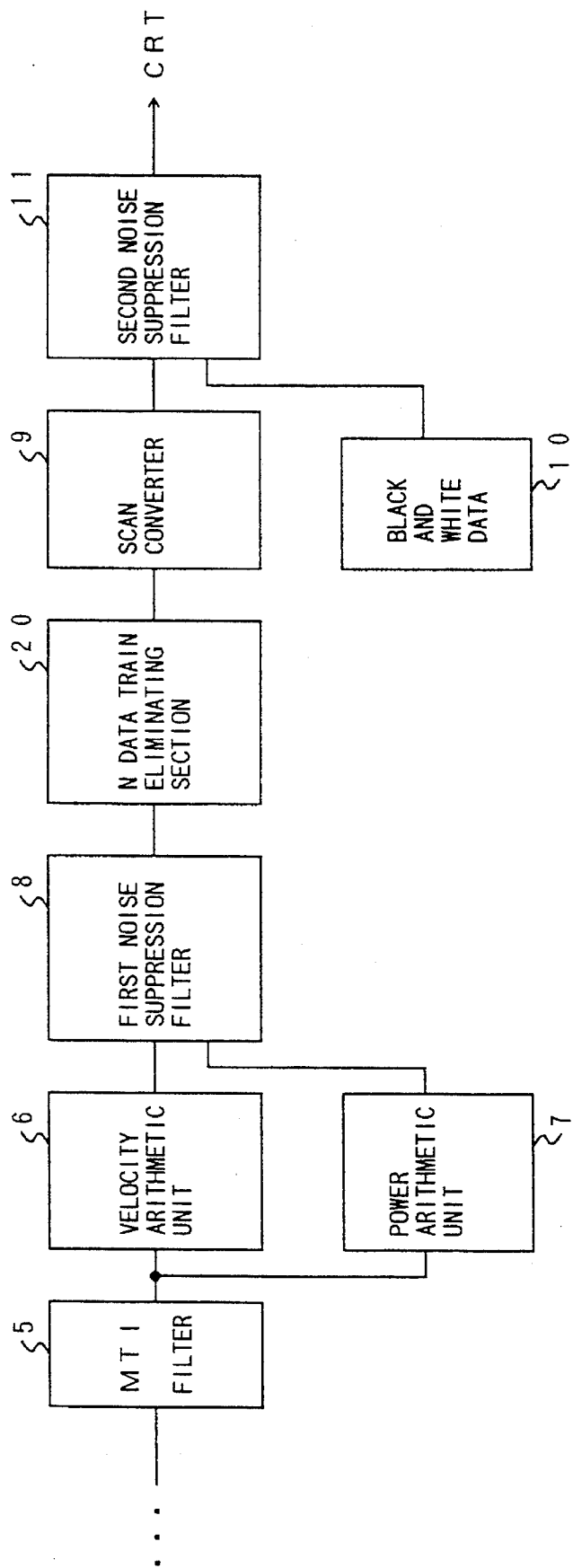
FIG. 1 is a schematic construction view of a part of color Doppler functions of an ultrasonic diagnostic apparatus of the present invention.

FIG. 1 is a schematic construction view of a part of color Doppler functions of an ultrasonic diagnostic apparatus of the present invention. In FIG. 1, the same parts are denoted by the same reference numbers as those of FIG. 5.

Figure 5:
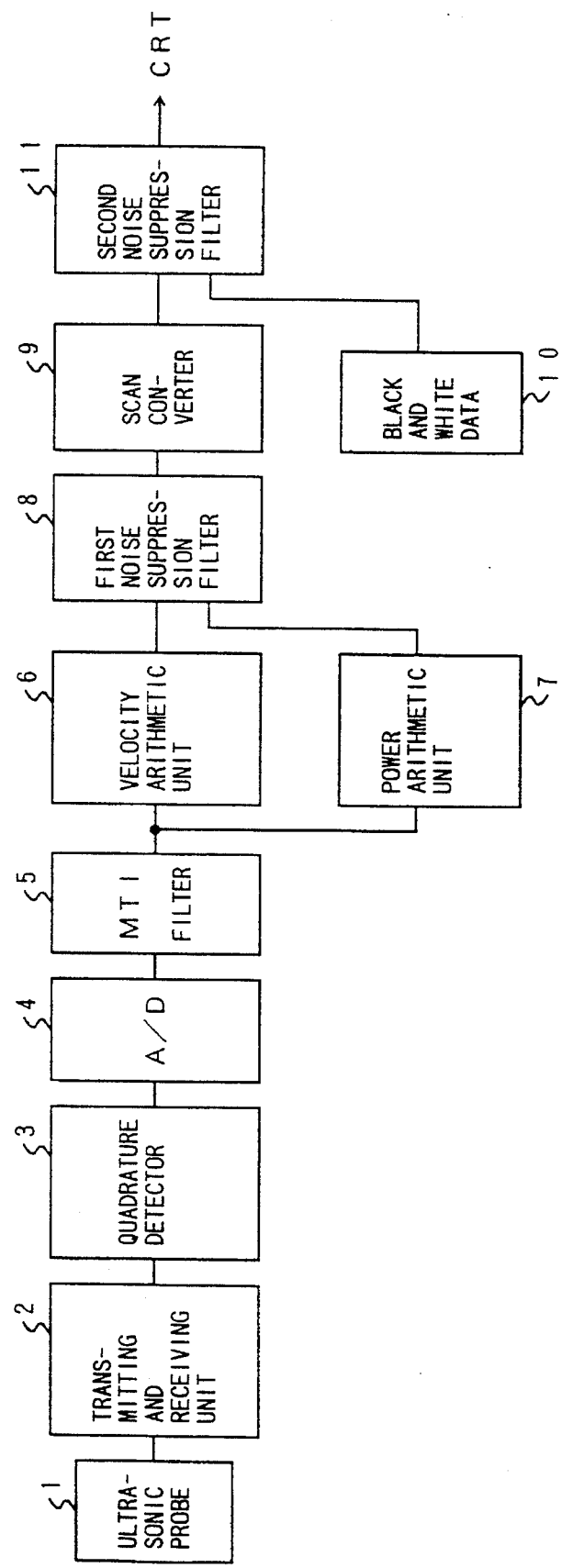
FIG. 5 is a block diagram showing a schematic construction of a portion of a color Doppler function of an ultrasonic diagnostic apparatus according to the related art.
Figure 6:
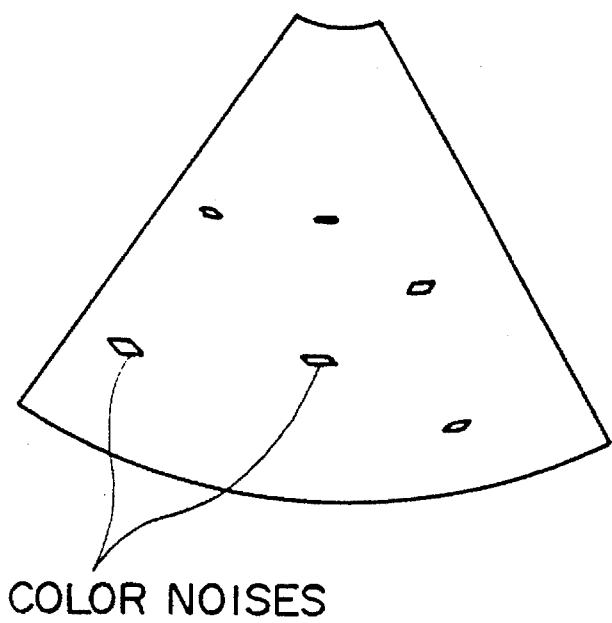
FIG. 6 is a typical illustration of color noises on an image.

According to the present embodiment shown in FIG. 1, it is different from that shown in FIG. 5 in the point that an N data train eliminating section 20 is provided between the first noise suppression filter 8 and the scan converter 9.

Figure 2:
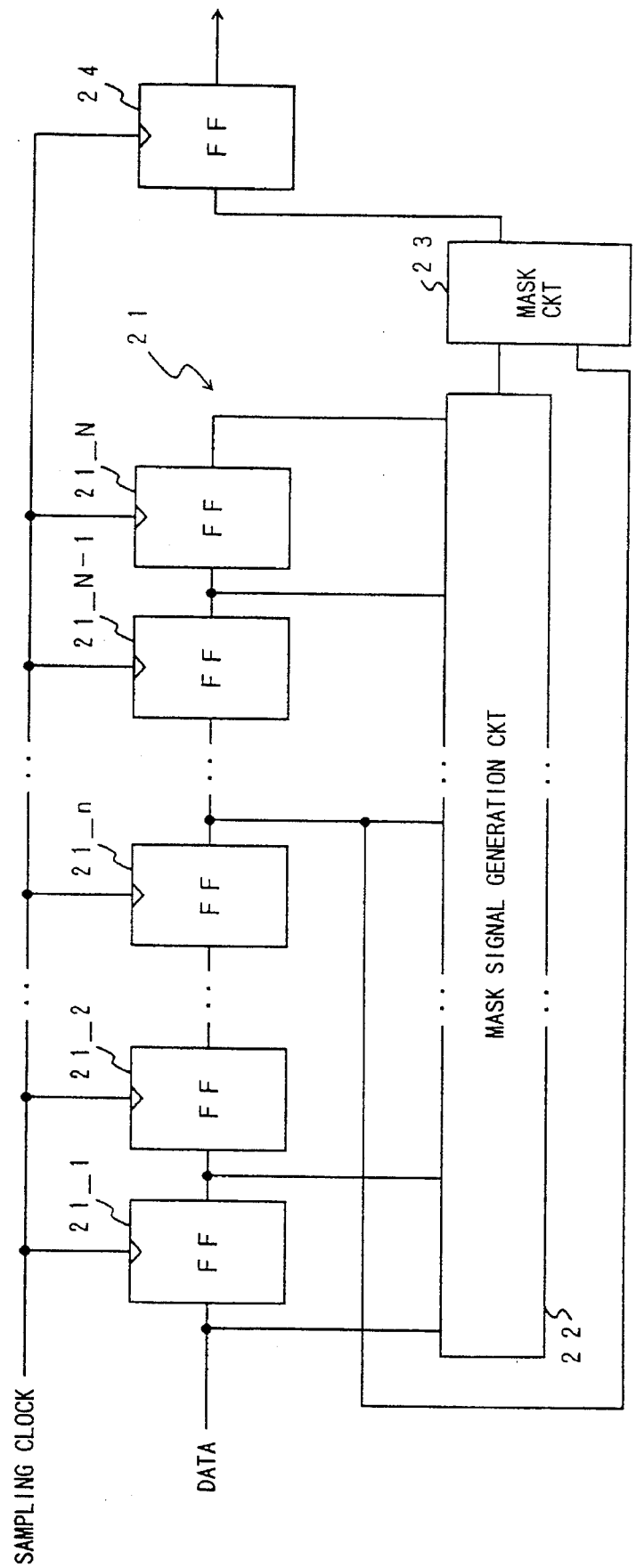
FIG. 2 is a circuit diagram of an N data train eliminating section shown in FIG. 1 with a block by way of example.

FIG. 2 is a circuit diagram of an N data train eliminating section shown in FIG. 1 with a block by way of example.

The N data train eliminating section shown in FIG. 2 comprises a shift register 21, a mask signal generation circuit 22, a mask circuit 23 and a flip-flop 24.

The shift register 21 is constituted of flip-flops 21_1, 21_2, ... 21_n, ... 21_N—1, 21_N which are sequentially connected. The number of these flip-flops is equal to the number N of pixels of continuous color noises which are intended to be eliminated. The shift register 21 has a bit width corresponding to that of the color data and is adapted to receive sequentially color data involved in a direction (depth direction) along the scan line in synchronism with sampling clocks.

The mask signal generation circuit 22 receives the respective outputs of N flip-flops 21_1, 21_2, ... 21_n, ... 21_N—1, 21_N, and an input of the first stage of flip-flop 21_1, that is, a total of (N+1) pieces of data. The mask signal generation circuit 22 determines whether the values of all of (N+1) pieces of data are zero which indicates that the blood flow velocity is zero. A result of the determination is fed to the mask circuit 23. The mask circuit 23 receives also output data of the flip-flop 21_n (n is an optional integer). When the mask signal generation circuit 22 determines that any one of (N+1) pieces of input data is data having the value zero, the mask circuit 23 outputs data having the value zero. On the other hand, when the mask signal generation circuit 22 determines that all of (N+1) pieces of input data is data having the value other than zero, which indicates that the blood flow velocity exists, the mask circuit 23 outputs the output data of the flip-flop 21_n as it is. An output data of the mask circuit 23 is fed to the additional flip-flop 24. An output of the flip-flop 24 is equivalent to an output of the N data train eliminating section 20 and is fed to the input of the scan converter 9 shown in FIG. 1.

According to the N data train eliminating section 20 shown in FIG. 2, with respect to a pixel train having N or less continuous data of the value other zero which are aligned in a depth direction, the data values of the pixel train are altered to zero. Thus, it is possible to completely eliminate color noises within N pixels as to the depth direction. Further, according to the scheme using the N data train eliminating section shown in FIG. 2, in a case where M (M>N) pieces of data each having the value other zero are aligned in a depth direction, the M pixels continuous color data is converted into a (M–N) pixels continuous color data. Therefore, the color noises consisting of pixels not less than (N+1), which are not completely eliminated, are so inconspicuous. Incidentally, according to the present scheme, the blood flow display is also reduced by the corresponding N pixels in the depth direction.

Figure 3:
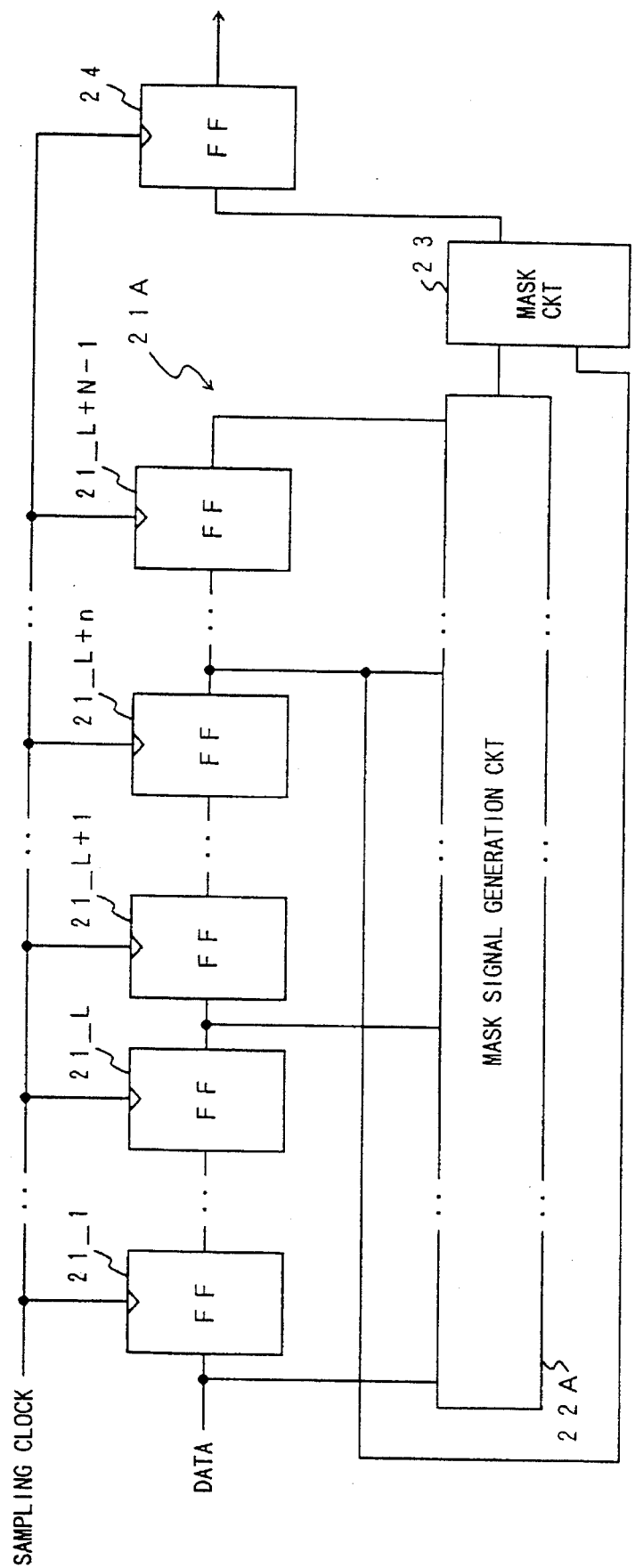
FIG. 3 is a circuit diagram of an N data train eliminating section shown in FIG. 1 with a block by way of another example.

FIG. 3 is a circuit diagram of an N data train eliminating section shown in FIG. 1 with a block by way of another example.

According to the N data train eliminating section shown in FIG. 2, there is provided the shift register 21 constituted of flip-flops 21_1, 21_2, ... 21_n, ... 21_N—1, 21_N the number of which is equal to the number N of pixels of continuous color noises to be eliminated. On the contrary, an N data train eliminating section shown in FIG. 3 is provided with a shift register 21A constituted of (L+N–1) pieces of flip-flops 21_1, ... 21_L, ... 21 L+1, 21_L+n, ... 21_L+N–1. In compliance with this arrangement, a mask signal generation circuit 22A is arranged to receive (L+N) pieces of data. The mask signal generation circuit 22A determines whether data having the value other than zero continuously appear over (N+1) pieces or more, in view of (L+N) pieces of data, different from the mask signal generation circuit 22 shown in FIG. 2. In a case where the data having the value other than zero continuously appear over (N+1) pieces or more, the mask circuit 23 outputs the output data of the flip-flop 21_L+n as it is. But if not, the mask circuit 23 outputs data having the value zero.

According to the scheme shown in FIG. 3, in a case where the data having the value other than zero continuously appear within N pieces, all of those data are replaced by the data having the value zero. On the condition of $L=K+1$, the number of data to be applied to the mask signal generation circuit 22A is given by $2N+1$. In this case, if the data having the value other than zero continuously appear within N pieces, all of those data are replaced by the data having the value zero. On the other hand, if the data having the value other than zero continuously appear by (N+A) pieces (where A is a positive integer), those data are not replaced by the data having the value zero, and are subjected to the color display keeping the length of the data train. If the number L is selected to be less than N+1, the length of the data train to be color-displayed is shortened by the corresponding reduced number.

According to the scheme shown in FIG. 3, a circuit scale will be enlarged in comparison with the scheme shown in FIG. 2. However, it is possible to eliminate color noises without reducing the width (or length) of the color image by the blood vessel to be essentially displayed.

It will be more effective to switch over between the scheme shown in FIG. 2, for example, in case of observation of the blood flow of a thick blood vessel and the scheme shown in FIG. 3 in case of observation of the blood flow of a fine blood vessel, in accordance with diagnostic sites, depth of the diagnostic sites and the like.

Figure 4:
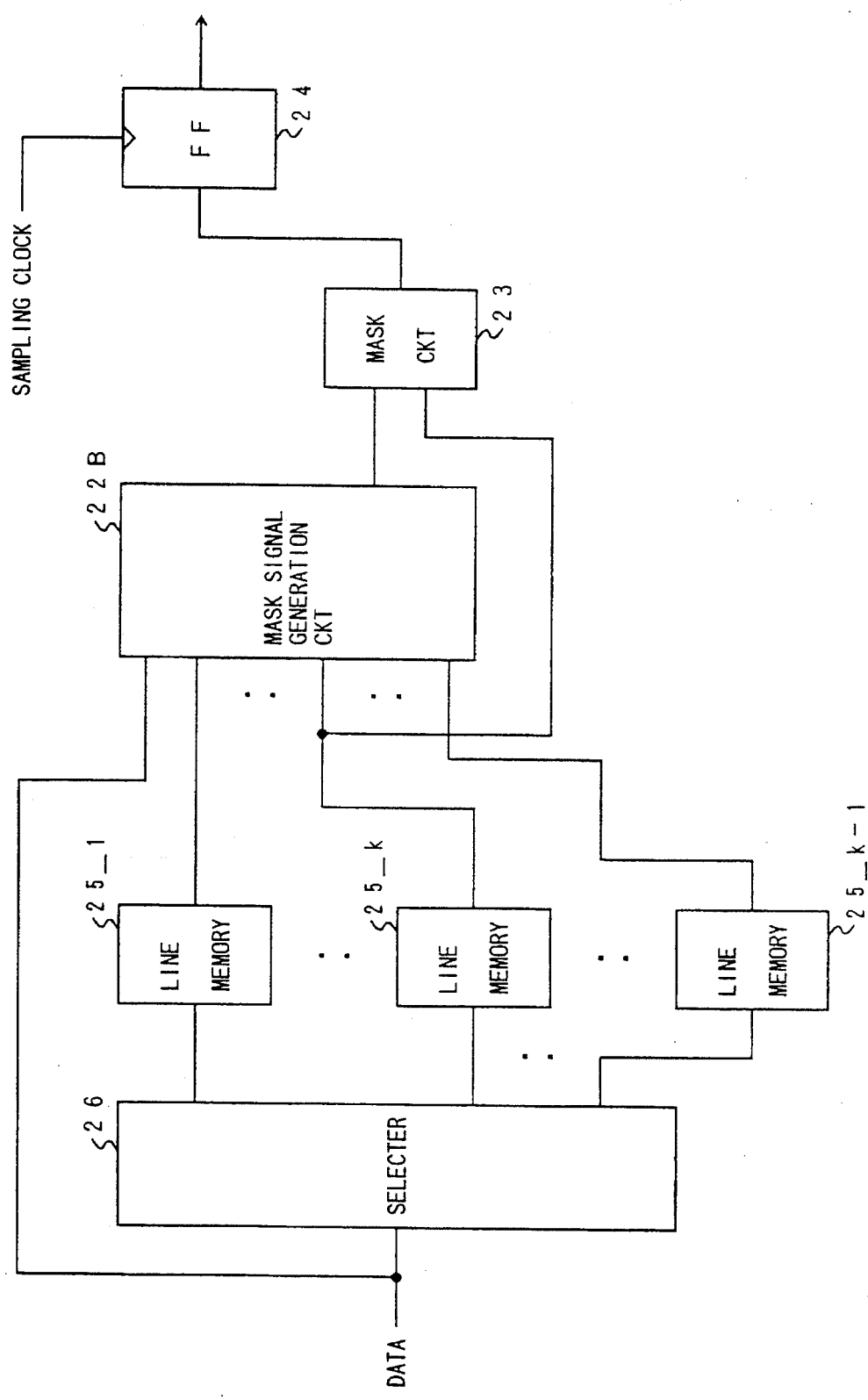
FIG. 4 is a circuit diagram of an N data train eliminating section shown in FIG. 1 with a block by way of still another example.

FIG. 4 is a circuit diagram of an N data train eliminating section shown in FIG. 1 with a block by way of still another example;

According to an N data train eliminating section shown in FIG. 4, there are provided line memories 25_1, ... 25_k, ... 25_K–1 each corresponding to the associated one of K scan lines except the final scan line. The color data corresponding to the respective scan lines are each sequentially stored through a selector 26 to the associated one of the line memories 25_1, ... 25_k, ... 25_K–1. Thereafter, color data corresponding to the first to (K–1)th scan lines, which are of the same depth as that of the pixel associated with the color data corresponding to the final Kth scan line now being entered, are read out of the line memories 25_1, ... 25_k, ... 25_K–1 in synchronism with the entry of the color data corresponding to the Kth scan line and then supplied to a mask signal generation circuit 22B. The mask signal generation circuit 22B is the same as the mask signal generation circuit 22 shown in FIG. 2 or the mask signal generation circuit 22A shown in FIG. 3 in the structure.

The use of the line memories 25_1, ... 25_k, ... 25_K–1 according to the scheme shown in FIG. 4 makes it possible, in a similar fashion to that of FIGS. 2 and 3, to perform the color noise eliminating operation with respect to the color data train which continuously appears in a direction coupling pixel-to-pixel on the same depth on the respective scan lines.

Incidentally, according to the examples as mentioned above, FIGS. 2 and 3 show the scheme in which a color noise eliminating operation is performed with respect to the depth direction, and FIG. 4 shows the scheme in which a color noise eliminating operation is performed with respect to the direction coupling pixel-to-pixel on the same depth on the respective scan lines. However, performing the color noise eliminating operation as to both the directions through the combination of those schemes makes it possible to further reduce the color noises and thus to obtain the color Doppler images which are further easy to see.

As described above, according to the ultrasonic diagnostic apparatus of the present invention, it is possible to obtain the color Doppler images which involve less color noises and thus are easy to see.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An ultrasonic diagnostic apparatus in which ultrasonic waves are transmitted and received in directions each along the associated one of a plurality of scan lines extending in a depth direction within the subject to obtain received signals, and data representative of displacement of respective pixel points along each scan line within the subject are evaluated on the basis of the thus obtained received signals, thereby displaying an image based on the data representative of the displacement, the ultrasonic diagnostic apparatus comprising:

N data train eliminating means for performing such a data replacement arithmetic operation that with respect to a pixel train wherein pixels of which data are representative of the presence of displacement appear continuously within N pixels in a predetermined direction, where N is a positive integer, data involved in the pixels constituting of said pixel train are replaced by data representative of the absence of the displacement.

2. An apparatus according to claim 1, wherein said N data train eliminating means performs further such a data replacement arithmetic operation that with respect to a pixel train wherein pixels of which data are representative of the presence of displacement appear continuously over N+1 pixels in said predetermined direction, data involved in N pixels appearing continuously from one end of said pixel train among the pixels constituting of said pixel train are replaced by data representative of the absence of the displacement.

3. An apparatus according to claim 2, wherein said N data train eliminating means performs the data replacement arithmetic operation, where a direction in which each scan line extends is referred to as said predetermined direction.

4. An apparatus according to claim 2, wherein said N data train eliminating means performs the data replacement arithmetic operation, where a direction coupling pixel-to-pixel in the same depth on the respective scan lines is referred to as said predetermined direction.

5. An apparatus according to claim 2, wherein said N data train eliminating means comprises a first N data train eliminating means for performing the data replacement arithmetic operation, where a direction in which each scan line extends is referred to as said predetermined direction, and a second N data train eliminating means for performing the data replacement arithmetic operation, where a direction coupling pixel-to-pixel in the same depth on the respective scan lines is referred to as said predetermined direction.

6. An apparatus according to claim 1, wherein said N data train eliminating means performs the data replacement arithmetic operation, where a direction in which each scan line extends is referred to as said predetermined direction.

7. An apparatus according to claim 1, wherein said N data train eliminating means performs the data replacement arithmetic operation, where a direction coupling pixel-to-pixel in the same depth on the respective scan lines is referred to as said predetermined direction.

8. An apparatus according to claim 1, wherein said N data train eliminating means comprises a first N data train eliminating means for performing the data replacement arithmetic operation, where a direction in which each scan line extends is referred to as said predetermined direction, and a second N data train eliminating means for performing the data replacement arithmetic operation, where a direction coupling pixel-to-pixel in the same depth on the respective scan lines is referred to as said predetermined direction.

9. An ultrasonic diagnostic apparatus in which ultrasonic waves are transmitted and received in directions each along the associated one of a plurality of scan lines extending in a depth direction within the subject to obtain received signals, and data representative of displacement of respective pixel points along each scan line within the subject are evaluated on the basis of the thus obtained received signals, thereby displaying an image based on the data representative of the displacement, the ultrasonic diagnostic apparatus comprising:

N data train eliminating unit for performing such a data replacement arithmetic operation that with respect to a pixel train wherein pixels of which data are representative of the presence of displacement appear continuously within N pixels in a predetermined direction, where N is a positive integer, data involved in the pixels constituting of said pixel train are replaced by data representative of the absence of the displacement.

10. An apparatus according to claim 9, wherein said N data train eliminating unit performs further such a data replacement arithmetic operation that with respect to a pixel train wherein pixels of which data are representative of the presence of displacement appear continuously over N+1 pixels in said predetermined direction, data involved in N pixels appearing continuously from one end of said pixel train among the pixels constituting of said pixel train are replaced by data representative of the absence of the displacement.

11. An apparatus according to claim 10, wherein said N data train eliminating unit performs the data replacement arithmetic operation, where a direction in which each scan line extends is referred to as said predetermined direction.

12. An apparatus according to claim 10, wherein said N data train eliminating unit performs the data replacement arithmetic operation, where a direction coupling pixel-to-pixel in the same depth on the respective scan lines is referred to as said predetermined direction.

13. An apparatus according to claim 10, wherein said N data train eliminating unit comprises a first N data train eliminating unit for performing the data replacement arithmetic operation, where a direction in which each scan line extends is referred to as said predetermined direction, and a second N data train eliminating unit for performing the data replacement arithmetic operation, where a direction coupling pixel-to-pixel in the same depth on the respective scan lines is referred to as said predetermined direction.

14. An apparatus according to claim 9, wherein said N data train eliminating unit performs the data replacement arithmetic operation, where a direction in which each scan line extends is referred to as said predetermined direction.

15. An apparatus according to claim 9, wherein said N data train eliminating unit performs the data replacement arithmetic operation, where a direction coupling pixel-topixel in the same depth on the respective scan lines is referred to as said predetermined direction.

16. An apparatus according to claim 9, wherein said N data train eliminating unit comprises a first N data train eliminating unit for performing the data replacement arithmetic operation, where a direction in which each scan line extends is referred to as said predetermined direction, and a second N data train eliminating unit for performing the data replacement arithmetic operation, where a direction coupling pixel-to-pixel in the same depth on the respective scan lines is referred to as said predetermined direction.

* * * * *